(12) United States Patent
Varvarezos et al.

(10) Patent No.: US 10,026,046 B2
(45) Date of Patent: Jul. 17, 2018

(54) RUNDOWN BLENDING OPTIMIZATION APPARATUS AND METHOD

(75) Inventors: Dimitrios Varvarezos, Houston, TX (US); Hong Chan, Plano, TX (US); Stacy Janak, Katy, TX (US)

(73) Assignee: Aspen Technology, Inc., Bedford, MA (US)

( * ) Notice: Subject to any disclaimer, the term of this patent is extended or adjusted under 35 U.S.C. 154(b) by 421 days.

(21) Appl. No.: 13/475,219

(22) Filed: May 18, 2012

(65) Prior Publication Data

US 2012/0296690 A1 Nov. 22, 2012

Related U.S. Application Data

(60) Provisional application No. 61/488,491, filed on May 20, 2011.

(51) Int. Cl.
*G06Q 10/06* (2012.01)
*G06Q 10/08* (2012.01)

(52) U.S. Cl.
CPC .......... *G06Q 10/06* (2013.01); *G06Q 10/08* (2013.01)

(58) Field of Classification Search
CPC .. G06Q 10/06316; G06Q 10/06; G06Q 10/10; G06Q 10/0633; G06Q 10/0631
See application file for complete search history.

(56) References Cited

U.S. PATENT DOCUMENTS

| | | | |
|---|---|---|---|
| 5,799,286 A * | 8/1998 | Morgan et al. | 705/30 |
| 6,219,654 B1 * | 4/2001 | Ruffin | 705/400 |
| 7,194,458 B1 * | 3/2007 | Micaelian et al. | 707/706 |
| 7,505,827 B1 * | 3/2009 | Boddy | G06Q 10/06 700/100 |
| 8,788,068 B2 | 7/2014 | Kocis et al. | |
| 2003/0004746 A1 * | 1/2003 | Kheirolomoom et al. | 705/1 |
| 2003/0065805 A1 * | 4/2003 | Barnes, Jr. | 709/231 |
| 2005/0136946 A1 * | 6/2005 | Trossen et al. | 455/456.2 |
| 2005/0159969 A1 * | 7/2005 | Sheppard | 705/1 |

(Continued)

FOREIGN PATENT DOCUMENTS

DE 10250325 A1 5/2004

OTHER PUBLICATIONS

Jia, Z. and Ierapetritou, M., "Mixed-Integer Linear Programming Model for Gasoline Blending and Distribution Scheduling," *Ind. Eng. Chem. Res.*, 42, 825 (2003).

(Continued)

*Primary Examiner* — Anita Coupe
*Assistant Examiner* — Nancy Prasad
(74) *Attorney, Agent, or Firm* — Hamilton, Brook, Smith & Reynolds, P.C.

(57) ABSTRACT

A computer modeling apparatus and method optimize refinery operations. Included are an input module enabling user specification of inventory information including at least one rundown component, and user specification of refinery product commitments, and a processor routine executable by a computer and coupled to the input module. The processor routine, in response to the user specification, sequences refinery operations into a schedule that matches refinery commitments with inventory and unit rundown operations, wherein the refinery operations include refinery operations events, and provides on output a display of the schedule in a manner enabling optimized refinery operations.

16 Claims, 10 Drawing Sheets

(56) References Cited

U.S. PATENT DOCUMENTS

| | | | |
|---|---|---|---|
| 2006/0265261 A1* | 11/2006 | Wetzer et al. | 705/7 |
| 2007/0100475 A1* | 5/2007 | Korchinski | G05B 13/042 700/28 |
| 2008/0010107 A1* | 1/2008 | Small et al. | 705/9 |
| 2008/0093264 A1* | 4/2008 | Sarkar | C10L 1/04 208/196 |
| 2009/0299789 A1* | 12/2009 | Black et al. | 705/7 |
| 2010/0082143 A1* | 4/2010 | Pantaleano et al. | 700/105 |
| 2010/0332273 A1 | 12/2010 | Balasubramanian et al. | |
| 2011/0009984 A1* | 1/2011 | Mukhi et al. | 700/83 |
| 2011/0040399 A1* | 2/2011 | Lu | 700/102 |
| 2013/0339100 A1 | 12/2013 | Warrick et al. | |
| 2014/0379112 A1 | 12/2014 | Kocis et al. | |

OTHER PUBLICATIONS

Kunt, T., et al., "Using Other Optimization Technologies in PIMS," *PIMS Users Conference Proceedings*, Oct. 2001.

Rigby, B., et al., "The evolution of Texaco blending systems—from OMEGA to StarBlend," *Interfaces*, 25, 64 (1995).

"Notification of Transmittal of the International Search Report and the Written Opinion of the International Searching Authority, or the Declaration" for International Application No. PCT/US2012/038561, dated Dec. 18, 2012.

Honeywell, "Blending and Movement Automation: Open Blend Property Control," Specification and Technical Data, Document No. OB-SPT-340, Jul. 2010.

Honeywell, "Honeywell Blending Solution: Integrated Blend Planning, Property Control, Ratio Control and Data Management for Optimum Blending Performance," Solution Note, Jul. 2010.

International Preliminary Report on Patentability dated Nov. 20, 2013 in International Application No. PCT/US2012/038561 entitled "Rundown Blending Optimization Apparatus and Method".

Extended European Search Report of EP 12 78 9274 dated May 21, 2015; entitled "Rundown Blending Optimization Apparatus and Method".

Coxhead: "Integrated planning and scheduling systems for the refining industry", Optimization in Industry, XX, XX, Jan. 1, 1994 (Jan. 1, 1994), pp. 185-199, XP009025564.

\* cited by examiner

RUNDOWN BLENDING OPTIMIZATION APPARATUS AND METHOD

RELATED APPLICATION

This application claims the benefit of U.S. Provisional Application No. 61/488,491, filed on May 20, 2011.

The entire teachings of the above application are incorporated herein by reference.

BACKGROUND OF THE INVENTION

Optimal product blending and component inventory management is a complex and vital process that can ultimately define the profitability of a refining operation. Today, the objective of the product blending operations in a refinery is to meet all the shipment commitments on schedule, while operating within the tank inventory constraints both for the blending components as well as the blended products. In addition, this operation should be executed in an optimal fashion in terms of overall cost and profitability. An example of product blending operations in a refinery is shown in FIG. 1. A multi-period blending optimization system (e.g., Aspen MBO v. 6.6.39 in aspenOne v. 7.3 by assignee Aspen Technologies, Inc., Burlington, Mass.) has been developed that provides a detailed representation of the entire blending operation of a refinery complex. That historical Aspen MBO incorporates multiple blend headers and multiple blends in a multi-period event-driven campaign, using open-equation based optimization and modeling technology to produce the optimum schedule for multi-period blending, along with optimum recipes and blended volume for each blend, while addressing the underlying inventory optimization problem. In addition, historical Aspen MBO optimizes all facets of the production blending operations including all external component and product receipts and shipments, as well as relevant intra-refinery transfers.

Traditionally, the goal of blending operations has been to meet product demand and specifications and only as a by-product to minimize give-away losses, that is, losses that occur when premium quality product must be sold for the regular product price. Over the last decade, however, advances in modeling and optimization technology have enabled the deployment of complex nonlinear optimization modeling technologies to address this problem.

The objective of product blending operations in a refinery is to meet all the shipment commitments on schedule, while meeting all the quality specifications. At the same time, the entire blending operation needs to be within all tank inventory minimum and maximum constraints both for the blending components as well as for the blended products, for the predetermined campaign horizon. In addition, this entire operation should be executed in an optimal fashion in terms of both cost and quality giveaway by utilizing the least expensive components over the existing schedule time frame. In this way, the most valuable components can be better utilized in higher quality products or as direct sales, thus increasing the net profitability of the refinery. Even in cases where there is no room for producing more high-priced products and there is no opportunity for high-value component sales, benefits can be realized by reducing the operating cost of the refinery by lowering the demand on units that produce high-value components.

Multi-period blending optimization, however, was not designed to optimize blending operations for components without storage tanks, while some refineries, such as refineries in Eastern Europe, have such operations. Therefore, there is a need for a multi-period blending optimization system that can optimize blending operations for components without storage tanks

SUMMARY OF THE INVENTION

The invention generally is directed to a multi-period blending optimization system that can optimize blending operations including some rundown components, that is, components without intermediate storage tanks In one embodiment, a computer modeling apparatus includes an input module enabling user specification of inventory information including at least one rundown component, and user specification of refinery product commitments. The apparatus further includes a processor routine executable by a computer and coupled to the input module and responsive to the user specification by sequencing refinery operations into a schedule that matches refinery commitments with inventory and unit rundown operations, wherein the refinery operations include refinery operations events, and the processor routine provides as an output a display of the schedule in a manner enabling optimized refinery operations. Refinery operations events can include blending, transferring, receiving, or shipping components and/or refinery products, or any combination thereof. Inventory information can include tank levels and properties for at least one stored component. Examples of components include alkylate, reformate, isomerate, n-butane, light straight run, light catalytic naphtha, FCC gasoline, hydro-cracked gasoline, raffinate, CDU diesel, ligh cycle oil, coker gas oil, gas oil (e.g., light, heavy), benzene, aromatics (e.g., toluene, xylene), ethers (e.g., MTBE, ETBE, TAME), and alcohols (e.g., ethanol, methanol). Sequencing refinery operations events can include moving refinery operations events, and switching and/or splitting rundown component operations between refinery products and/or associated tanks Splitting rundown component operations can include changing qualities of component streams. Examples of refinery products include gasoline (e.g., regular, premium), diesel (e.g., road, off-road, marine), heating oil (e.g., light, medium, heavy), kerosene, aviation gasoline, jet fuel, distillates, fuel oil, and bunker fuel.

In another embodiment, a computer-implemented method of scheduling refinery operations includes collecting inventory information including at least one rundown component, collecting refinery product commitments, and sequencing refinery operations events into a schedule that matches refinery product commitments with inventory and unit rundown operations, such that the schedule of refinery operations is optimized.

This invention has many advantages, including explicit accounting for event sequencing including static and rundown components.

BRIEF DESCRIPTION OF THE DRAWINGS

The foregoing will be apparent from the following more particular description of example embodiments of the invention, as illustrated in the accompanying drawings in which like reference characters refer to the same parts throughout the different views.

The drawings are not necessarily to scale, emphasis instead being placed upon illustrating embodiments of the present invention.

DETAILED DESCRIPTION OF THE INVENTION

Figure 1:
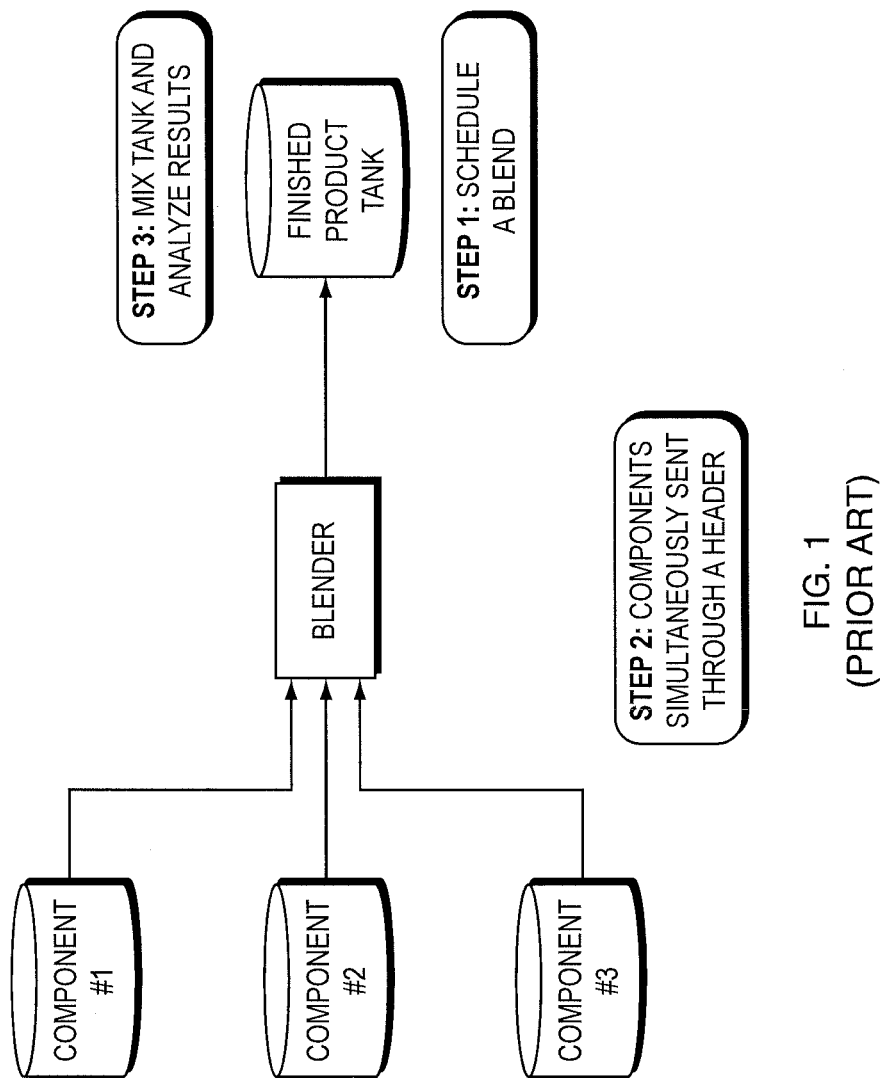
FIG. 1 is a schematic illustration of multi-period blending optimization in the prior art.

The first formal optimization of multi-period blending optimization was implemented on a blend-by-blend basis using single blend optimizers. This process was sub-optimal and prone to scheduling and feasibility problems especially for future blends. A multi-period blending approach was later introduced, but it was mostly limited to linear properties, with predetermined fixed-length periods and fixed blend volumes. Although that was an improvement, the inaccuracies introduced were significant in terms of property prediction (linear) and/or time aggregation (fixed length periods). One of the most evolved systems in this category is StarBlend, which was developed by Texaco. See Rigby, B.; Lasdon, L. S. and Waren A. D., *The evolution of Texaco blending systems—from omega to starblend*, Interfaces 1995, 25, 64. Although it is using a model written in GAMS and facilitates a subset of future requirements into present blending decisions, it still suffers from some of the limitations stated above. A detailed review of different blending systems can be found in Jia and Ierapetritou. See Jia, Z. and M. Ierapetritou, *Mixed-Integer Linear Programming Model for Gasoline Blending and Distribution Scheduling*, Ind. Eng. Chem. Res. 2003, 42, 825.

Historical Aspen MBO was subsequently improved to overcome the above limitations by a rigorous approach to modeling and solving the blending problem that removes the simplifications stated above. Improved Aspen MBO technology resulted. In the improved Aspen MBO technology, first, the number and duration of event periods are determined automatically by the intersection of all the events in the campaign (such as component changes, blends, shipments, receipts or transfers). Second, all the nonlinear properties are calculated properly using a nonlinear blending library. In addition, the users can provide their own proprietary blending correlations. Lastly, all event volumes (blend, shipment, receipt and transfer) are optimized simultaneously with the blend recipes. The modeling formulation provides an event-driven, accurate and detailed representation of the blending operations of any complex refinery.

The nonlinearities in the resulting model come from the rigorous calculation of nonlinear properties, such as distillation, octane, EPA and CARB correlations, as well as the pooling of streams in the simultaneous optimization of the recipe and volume of the blend events. This rigorous approach results in a large number of nonlinear variables and equations, typically in the order of tens of thousands for a two-week campaign.

In addition, operational constraints such as minimum thresholds for components into blends are modeled via the use of discrete variables. All optimized event quantities, such as blend, shipment, receipt, and transfer, can also have threshold limits (e.g., a transfer event can be of either 0 volume or at least 1000 Bbls). Those event quantities are also modeled through discrete variables. Finally, another class of operating constraints, related to the selection of a subset of components into a blend, is modeled using discrete variables. All of the above give rise to a mixed-integer nonlinear optimization problem (MINLP).

A modeling and optimization component (XNLP) addresses the above needs. See Kunt T.; Varvarezos D. and G. Paules, *Using Other Optimization Technologies in PIMS*, PIMS Users Conference Proceedings, October 2001. This component entails a modeling sub-component (XLP) and a MINLP solver (XSLP). At its core, the multi-period blending optimization of the improved Aspen MBO system provides a detailed representation of the entire blending operation of a refinery complex. Utilizing the XNLP component provides a comprehensive modeling representation that remains flexible in accommodating the diverse needs of this application. It incorporates multiple blend headers and multiple blends in a multi-period event-driven campaign, using open-equation based optimization and modeling technology. It produces the optimum schedule for multi-period blending along with optimum recipes and blended volume for each blend, addressing the underlying inventory optimization problem. It also optimizes all external component and product receipts and shipments, as well as intra-refinery transfers. The primary outputs of the system are:

Optimal recipes for each of the blends in the schedule.
Optimal blend volume for each blend.
Optimal shipping volumes for products as well as components.
Optimal receipt volumes for components as well as products.
Optimal transfer volumes for component and product intra-refinery transfers.
Estimates of active property constraints for each blend.
Projections of component tank inventory levels for the entire schedule of blends, including identification of all time periods with active inventory constraints.

There are two types of data required for representing blending operations in the improved Aspen MBO system.

First, there is structural configuration data such as:

a. Blending components and their associated tanks (name, limits), b. Product tanks (name, limits), c. Product codes with associated specifications and allowable components, and d. Blender information (rate limits).

Second, a large volume of temporal data required is:

a. Blends with associated detailed information (product type, volume limits, tank, rate, start and stop time), b. Shipments with detailed information (volume limits, tank, rate, start and stop time), c. Receipts with associated detailed information (volume limits, tank, rate, start and stop time), d. Transfers with associated detailed information (volume limits, tank, rate, start and stop time), e. Campaign start time and duration,
f. Starting inventory position for all tanks (quantities as well as all the required properties), and
g. Daily flows into the component tanks System Architecture Embodiments of the present invention rely on three technology pillars to effectively address the complex decision-making problem in blending operations. First, a modern, user-friendly, graphical interface with interactive schedule charts. Second, a database model for storage and retrieval of all scheduling data, and third a modeling and optimization component (XNLP) that enables the automatic, data-driven generation and optimization of a large periodic MINLP model.

Benefits

Many refineries employ good process control and optimization practices in their component production units only to surrender a portion of these benefits by insufficient attention to final product blending. While blend trim optimization of each individual blend can eliminate lost revenue from property giveaway and re-blending, a rigorous multiple blend optimizer can enhance profits by identifying inventory bottlenecks. Multi-period blend optimization provides the user the ability to simultaneously optimize all blend recipes along with all the event volumes (blends, shipments, receipts and transfers). This approach utilizes most of the available degrees of freedom leading to superior economic benefits. It also provides the blend scheduler with an opportunity to confidently do the following:

Adjust the operation (rate or properties) of a blend component production unit,
Re-negotiate the delivery time or volume of a blended product, and
Adjust the purchase or sales volume of externally supplied components.

This includes reducing the purchase of expensive blend additives, or increasing the sale of expensive blend chemicals.

These actions ensure that the least expensive combination of available components is used for the production of each blend. Improvements in blending operations can yield benefits of $0.20 to $0.70 per barrel, depending upon current operating practices, the product slate produced, cost differentials between blend components and capabilities for recovering benefits from adjustments to the overall refinery-wide production plan. A measure of the potential savings from rigorous blend optimization can be made by comparing the cost of the refinery-wide optimization blends to the current actual average cost of blended products.

The benefits of modeling and optimizing the entire blending operation using the framework described herein are higher utilization of the lower-value components, such as butane, and lower utilization of high-value components, such as alkylate, reformate and aromatics, resulting in the utilization of the most valuable components in additional higher quality products or in direct sales, thus increasing the net profitability of the refinery. Even in case where there is no market for additional high-priced products and there is no opportunity for selling the high-value component, benefits can be still realized by reducing the operating cost of the refinery by lowering the demand on units that produce high-value components.

Figure 2:
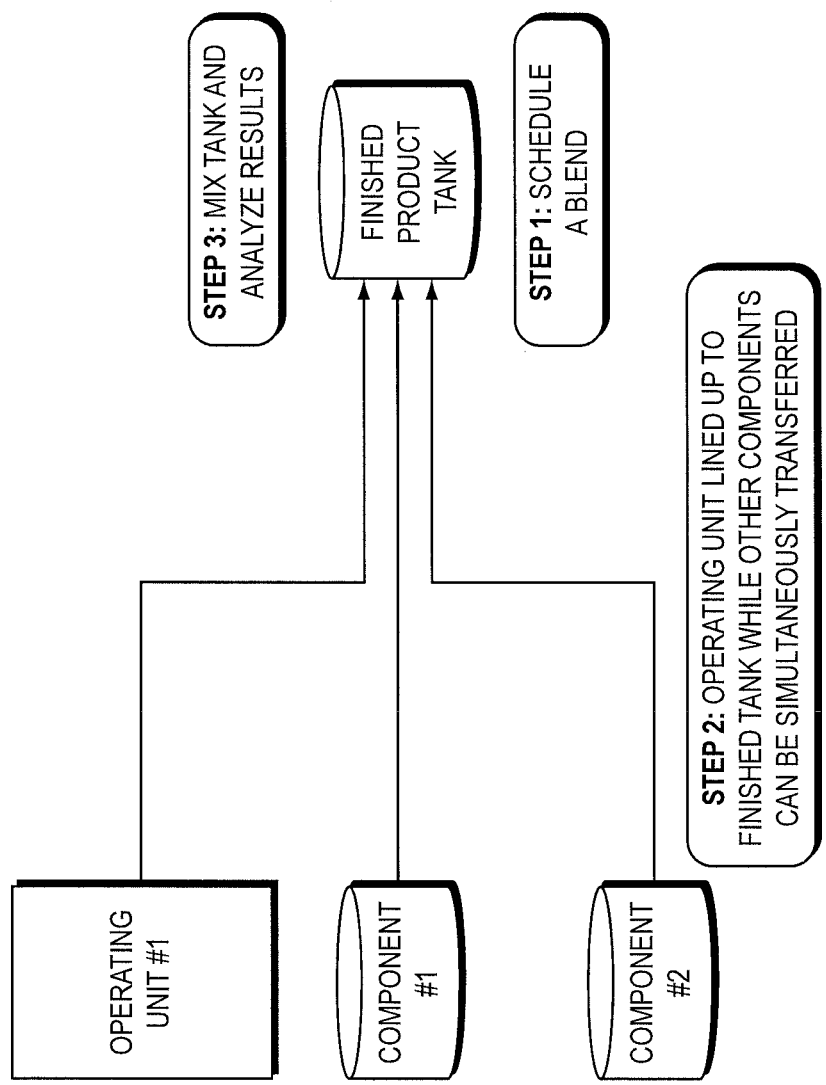
FIG. 2 is a schematic illustration of multi-period blending optimization with rundown blending according to this invention.

Rundown blending refers to a blending configuration where streams are blended directly off a process unit to a finished product tank, so that there are some streams which do not have intermediate storage, as shown in FIG. 2. Typical configurations for rundown blending include mixing of hot streams from a process unit with components from static tanks, where the components are not necessarily fed into the product tank simultaneously.

In addition, further embodiments include splitters that separate the rundown components into multiple streams of potentially different flow and qualities. The splitter operation also includes the ability to enforce threshold values on one or more of the splitter output streams. This functionality introduces semi-continuous variables for the splitter operations. If a splitter product is associated with a semi-continuous variable, then the fraction of the splitter feed ending up in that output stream can either be zero or at least the minimum amount designated for that stream, defining a threshold value for the stream. If the flow should be dispositioned into only one of the splitter output streams, then each stream should be designated as semi-continuous with a minimum value equal to the entire input flow. The operation of the splitter can also be fixed or bounded over a given time period. The user can fix the splitter operation to remain constant over the defined time period or they can fix the disposition of the splitter streams to remain at a given value over the defined time period. In addition, the splitter unit operation can be used to model more general unit operations by enabling changes in properties from the input to the output streams. In this way, the user can model the effects of process units that can be part of the splitter that change the qualities of the separate component streams. Examples of such process units include hydrotreaters, which alter the sulfur content of the input stream, catalytic reformers, and several others that contribute components to fuel blending operations, resulting in different qualities of the separate streams.

Figure 3:
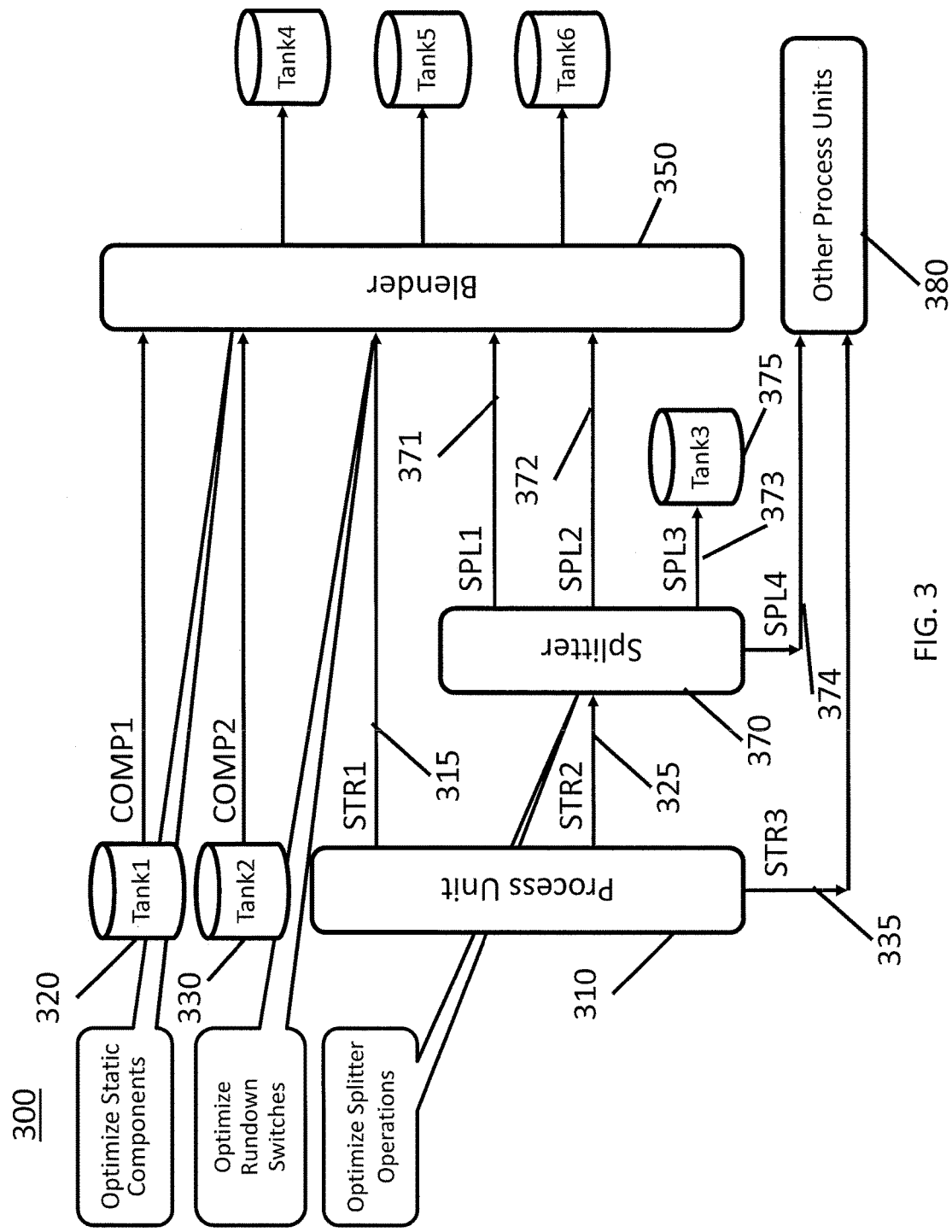
FIG. 3 is a schematic illustration of a flow configuration for rundown blending.

FIG. 3 illustrates some possible configurations for rundown blending. In this layout 300, there is a single process unit 310 and two static component tanks, Tank1 (320) and Tank2 (330). The process unit 310 sends stream 315 directly to the blender 350, sends stream 325 to a splitter 370, and sends stream 335 to other processing units 380. Stream STR1 (315) is a rundown stream since it proceeds directly from the process unit 310 to blending without any intermediate storage. Stream STR2 (325) is the feed into splitter unit 370. The splitter has four output streams 371, 372, 373, and 374. Streams SPL1 (371) and SPL2 (372) proceed directly to blending without any available intermediate storage and thus are rundown streams. Stream SPL3 (373) is sent to a static component tank 375, Tank 3, and can be subsequently used for blending as needed. Tank 3 (375) can also be viewed as a distressed (slop) tank that will absorb the feed to the splitter 370 should there be a downstream blending disturbance affecting SPL1 (371) and SPL2 (372).

The scope of the rundown blending project for embodiments of the present invention is to determine the optimum split ratio for any splitters, the duration and timing of the rundown component to the blend, and the amount of each static component for the blend, using a modeling and optimization apparatus and method that determines the optimal sequence and timing of blend events and rundown component tank switches.

Figure 4:
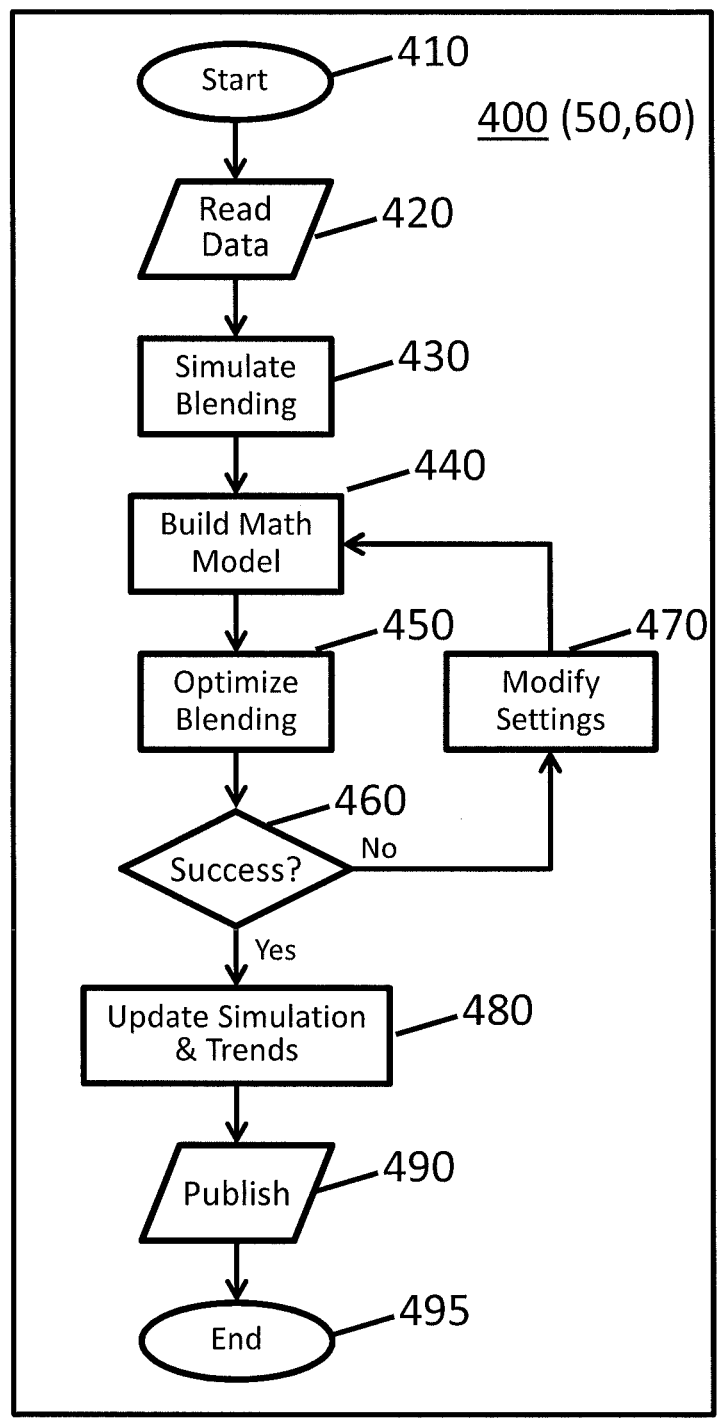
FIG. 4 is a schematic illustration of a workflow diagram of the improved Aspen MBO system according to this invention.

FIG. 4 illustrates the workflows of the rundown blending modeler 400 supported by the principles of the present invention. Rundown blending engine 400 begins with opening the application at step 410, after which step a model is selected and data is read from the associated database at step 420. The data is then loaded into the process simulator which models the current blending operations at step 430. The user then executes the application which builds the mathematical model at step 440, and optimizes the resulting blending problem at step 450 using the XNLP modeling and solver component. If the optimization blending step fails, meaning that an acceptable solution cannot be found at step 460, the user is prompted to modify settings at step 470 for the model and run step 440 again. Once the optimization step 450 is successful, the blending simulation is updated at step 480 along with the results and trends in the application. The user can then choose to publish the updated model to the database at step 490, if desired, and exit the application at step 495.

Mathematical Model

Consider a set of times, $t \in T$, for each rundown component, $c \in C$, in a time horizon. The rate and property values for the rundown component can change only at these times. Also, each rundown blend event is given an earliest start and latest stop to define the window of time in which it can take place. The set of times for the rundown component as well as the earliest start and latest stop for the associated blend event determine the number of periods in the set T for that blend and component combination, or set TBC. Note that, in general, the elements in the set TC will not be the same for each component, unless those components are related, either through the same blend or as products of the same splitter.

Indices and Sets:
- $c \in C$ rundown components (i.e., components without storage tanks)
- $b \in B$ blends
- $b \in BC$ blends that use rundown component c
- $i \in I$ properties
- $t \in T$ times
- $t \in TC$ times for rundown component c
- $t \in TBC$ times for rundown component c in blend b
- $s \in S$ splitters
- $c \in SC$ components c that are products of splitter s Parameters:
- RD(c,t), rundown for component (c) at time (t)
- Prop(i,c,t), value for property (i) of component (c) at time (t)
- NB(c), the number of simultaneous blends for component (c), typically 1

Variables:
- yB(b,c,t) binary, fill begin for component (c) to blend (b) at time (t)
- yE(b,c,t) binary, fill end for component (c) to blend (b) at time (t)
- SB(b,c,t) continuous, fill has begun for component (c) to blend (b) by time (t)
- SE(b,c,t) continuous, fill has ended for component (c) to blend (b) by time (t)
- XRD(b,c,t) continuous, volume of component (c) to blend (b) at time (t)
- XRDS(b,c) continuous, volume of component (c) to blend (b) at start time
- XRDS(b, c, t) continuous, volume of component (c) to blend (b) at time (t) if starting at that time
- XRDE(b,c) continuous, volume of component (c) to blend (b) at end time
- XRDE(b,c,t) continuous, volume of component (c) to blend (b) at time (t) if ending at that time
- X(b, c) continuous, total volume of component (c) to blend (b)
- PRD(i, b, c, t) continuous, total property barrels of property (i) for component (c) to blend (b) at time (t)
- PRDS(i, b, c) continuous, total property barrels of property (i) for component (c) to blend (b) at start time
- PRDE(i, b, c) continuous, total property barrels of property (i) for component (c) to blend (b) at end time
- P(i,b,c) continuous, total property barrels of property (i) for component (c) to blend (b)
- FRAC(c, t) continuous or semi-continuous, fraction of the associated splitter feed dispositioned to component (c) at time (t)

Equations:

1) Each component can only turn on and off at most once in the entire time horizon for each blend. This is a design decision that can be changed if desired.

$$\sum_{t=0}^{TC} yB(b, c, t) \leq 1, \forall c \in C, b \in BC \quad (1)$$

$$\sum_{t=0}^{TBC} yE(b, c, t) \leq 1, \forall c \in C, b \in BC \quad (2)$$

2) Variables SB(b,c,t) and SE(b,c,t) are declared as continuous variables although they can take on a value of 0 or 1 and indicate if the component has started or ended filling, respectively, in the blend at that time. Equations (3) and (4) define these continuous variables and equation (5) ensures that each component can only finish filling in a blend if it has already begun filling in that blend. Note that for in-progress blends, variable SB(b,c,t) needs to be fixed to be 1 for the first time period.

$$SB(b, c, t) = \sum_{\tau=0}^{\tau=t} yB(b, c, \tau), \forall c \in C, b \in BC, t \in TBC \quad (3)$$

$$SE(b, c, t) = \sum_{\tau=0}^{\tau=t} yE(b, c, \tau), \forall c \in C, b \in BC, t \in TBC \quad (4)$$

$$SE(b, c, t) \leq SB(b, c, t), \forall c \in C, b \in BC, t \in TBC \quad (5)$$

3) Equation (6) defines volume of component (c) for blend (b) at time (t), where RD(c,t) is the rundown amount of the component at that time. Note that for components coming from splitters, RD(c,t) is not a constant parameter, but is a variable that represents a fraction of the total rundown of the feed stream into the splitter. Equations (7) and (8) provide for special handling for the start and stop periods. This is needed since the component may not utilize the entire time period. Variables are needed to indicate how much of the rundown was used for that time period for the current period. These equations serve as big-M constraints that provide upper bounds on the partial volumes attributed to the start and stop periods. Big-M constraints are mathematical structures that effectively allow binary variables to control continuous variables by turning them on and off. For example, if a binary variable is zero, the associated big-M constraint ensures that the corresponding rundown component flow for the associated period and product blend is also zero.

$$XRD(b, c, t) = (SB(b, c, t) - SE(b, c, t)) * RD(c, t), \quad (6)$$
$$\forall c \in C, b \in BC, t \in TBC$$

$$XRDS(b, c) \leq \sum_{t=0}^{TBC} RD(c, t) * yB(b, c, t), \forall c \in C, b \in BC \quad (7)$$

$$XRDE(b, c) \leq \sum_{t=0}^{TBC} RD(c, t) * yE(b, c, t), \forall c \in C, b \in BC \quad (8)$$

4) Equation (9) defines of the total property barrels of the component (c) in blend (b) at time (t) where Prop(i,c,t) is the constant property value for that component at that time period. Typically, PRD(i,b,c,t) is fixed at Prop(i,c,t) regardless of whether or not the component is going to the blend at that period. Equations (10) and (11) determine the property values for the component in the blend at the start and stop periods, respectively. If the set of t ∈ T only contains a single element, then PRDS(i, b, c) and PRDE (i,b,c) are fixed at Prop(i,c,t).

$$PRD(i, b, c, t) = (SB(b, c, t) - SE(b, c, t)) * Prop(i, c, t), \quad (9)$$
$$\forall i \in I, c \in C, b \in BC, t \in TBC$$

$$PRDS(i, b, c) = \sum_{t=0}^{TBC} Prop(i, c, t) * yB(b, c, t), \forall i \in I, c \in C, b \in BC \quad (10)$$

$$PRDE(i, b, c) = \sum_{t=0}^{TBC} Prop(i, c, t) * yE(b, c, t), \forall i \in I, c \in C, b \in BC \quad (11)$$

5) Equation (12) defines the total volume of component (c) contributing to blend (b) in the time horizon. Equation (13) defines the total property barrels (i) for component (c) in blend (b) in the time horizon. These equations take into account the special handling of the start and stop periods.

$$X(b, c) = \sum_{t=0}^{TBC} XRD(b, c, t) - XRDS(b, c) + XRDE(b, c), \quad (12)$$
$$\forall c \in C, b \in BC$$

$$P(i, b, c) = \sum_{t=0}^{TBC} PRD(i, b, c, t) - PRDS(i, b, c) + PRDE(i, b, c), \quad (13)$$
$$\forall i \in I, c \in C, b \in BC$$

6) Equation (14) governs multiple blends that are utilizing the same component (c). The parameter NB(c) controls the number of simultaneous blends that can use a rundown component in a single time period. Equation (15) is a material balance on the utilization of the rundown component (c) at each time period. This equation ensures that at each time point, the total rundown of the component, RD(c, t) is used by the sum of all possible blends. For components coming from splitters, note that RD(c,t), is not a constant parameter, but is a variable representing the fraction of the total rundown of the feed stream into the splitter. Equations (16) and (17) are supporting equations that define the XRDS and XRDE variables at each time period to the total over all time periods.

$$\sum_{b=0}^{BC} SB(b, c, t) - SE(b, c, t) \le NB(c), \forall c \in C, t \in TC \quad (14)$$

$$\sum_{b=0}^{BC} [XRD(b, c, t) - XRDS(b, c, t) + XRDE(b, c, t)] = RD(c, t), \quad (15)$$
$$\forall c \in C, t \in TC$$

$$\sum_{t=0}^{TBC} XRDS(b, c, t) = XRDS(b, c), \forall c \in C, b \in BC \quad (16)$$

$$\sum_{t=0}^{TBC} XRDE(b, c, t) = XRDE(b, c), \forall c \in C, b \in BC \quad (17)$$

7) The inclusion of splitter operations in the rundown blending problem adds some additional equations. Equation (18) is a total material balance on the each splitter. It enforces that for each splitter, the sum of the fractions for each output stream must sum 1.

$$\sum_{c=0}^{SC} FRAC(c, t) = 1, \forall s \in S, t \in T \quad (18)$$

In addition, for components (c) that are output streams of splitters, instead of using the constant value of RD(c,t) in equations (6)-(8), RD(c,t)*FRAC(c,t) should be used, where RD(c,t) is the rundown rate of the splitter feed stream at time (t). This quantity then represents the rate of the splitter output stream, or component (c), as a function of the rate of the rundown fed into the splitter.

8) The objective function for rundown blending is represented in equation (19)

$$MAX\left(\sum_{b=0}^{B} Price_b * Vol_b - \sum_{c=0}^{C} Cost_c * Vol_c - \text{Penalties}\right) \quad (19)$$

where $Price_b$ is the price of blend (b), $Vol_b$ is the total volume of blend (b), $Cost_c$ is the cost of component (c), and $Vol_c$ is the total volume of component (c). For rundown blending, some penalties have been added to the objective function in order to encourage the sequence of the blends to remain the same from one optimization to the next. Robustness of the blend schedule is critical for it to be practical. The sequence of the blends should not change each time the problem is re-optimized. The penalties are defined in equations (20) and (21) where $yB^o(b,c,t)$ and $yE^o(b,c,t)$ are the initial values of the binary variables which indicate if a rundown component (c) starts or ends in a blend (b) at time (t), respectively. These constant values are determined using the initial start and stop times of the rundown blend event in the simulation. They are set to 1 if the component started (or ended) in the blend in that time period and are set to 0 otherwise. The total penalty term used in the objective function is defined in equation (22) and is the sum of all of the individual penalties where the positive and negative deviations can be penalized by different amounts, α and β.

$$yB(b, c, t) + \delta_B^P(b, c, t) - \delta_B^N(b, c, t) = yB^o(b, c, t), \quad (20)$$
$$\forall c \in C, b \in BC, t \in TBC$$

$$yE(b, c, t) + \delta_E^P(b, c, t) - \delta_E^N(b, c, t) = yE^o(b, c, t), \quad (21)$$
$$\forall c \in C, b \in BC, t \in TBC$$

-continued $$\text{Penalties} = \alpha \sum_{c=0}^{C} \sum_{b=0}^{BC} \sum_{t=0}^{TBC} (\delta_B^P(b,c,t) + \delta_E^P(b,c,t)) + \quad (22)$$

$$\beta \sum_{c=0}^{C} \sum_{b=0}^{BC} \sum_{t=0}^{TBC} (\delta_B^N(b,c,t) + \delta_E^N(b,c,t))$$

Penalties have also been added to minimize the number of changes in the split ratios for each splitter. The penalties are defined in equations (23). The total penalty term used in the objective function is defined in equation (24) and is the sum of all of the individual penalties where the positive and negative deviations can be penalized by different amounts, $\gamma$ and $\varepsilon$.

$$FRAC(c,t) - FRAC(c,t-1) + \delta_S^P(c,t) - \delta_S^N(c,t) = 0, \quad (23)$$
$$\forall s \in S, c \in SC, t \in TC$$

$$\text{Penalties} = \quad (24)$$
$$\gamma \sum_{s=0}^{S} \sum_{c=0}^{SC} \sum_{t=0}^{TC} (\delta_S^P(c,t) + \delta_S^P(c,t)) + \varepsilon \sum_{s=0}^{S} \sum_{c=0}^{SC} \sum_{t=0}^{TC} (\delta_S^N(c,t) + \delta_S^N(c,t))$$

EXEMPLIFICATION

The first example problem used to demonstrate rundown blending comes from an actual customer blending operation. This example is directed to diesel blending and the time horizon of interest is 16 days. During the time horizon, there are six rundown blend events for a single product, low sulfur diesel, which can be made from two different rundown components and a static component. In addition, there are three product tanks used by the rundown blend events and five fixed shipments spread out over the horizon. The challenge of rundown blending is to determine the sequence and timing of the blend events as well as their optimal recipes while ensuring that the entire volume of both rundowns is used as it becomes available.

Figure 5:
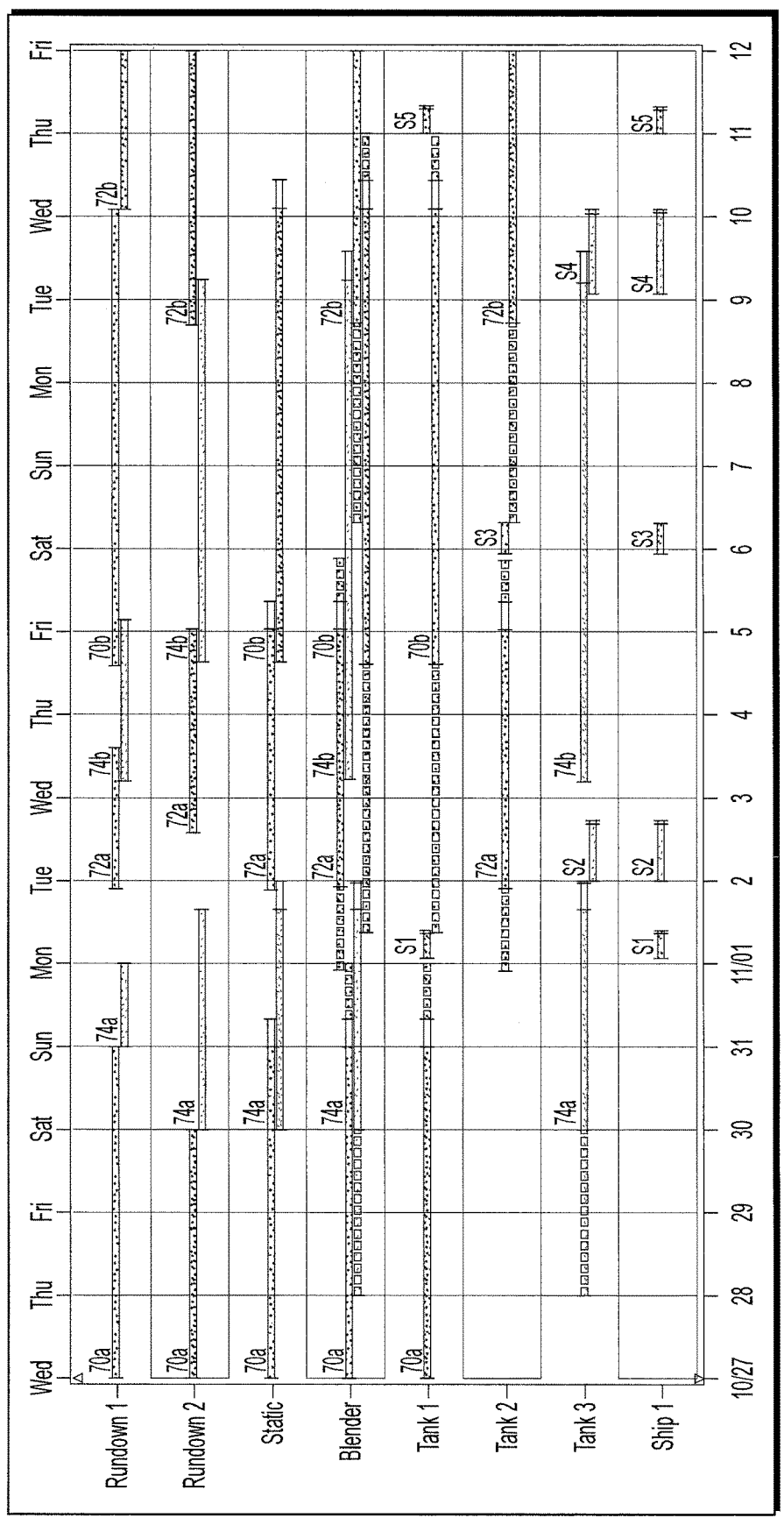
FIG. 5 is a schematic illustration of a manually created Gantt chart.

The Gantt chart for a manually created blend schedule is shown in FIG. 5. The bottom of the chart shows the time horizon, from October 27 to November 12, or 16 days. The labels on the left side are the individual resources in the process. The three rows at the top are for the components, where the first two are the rundown components Rundown 1 and Rundown 2. The next six rows are for the relevant process units and these show the blend events and product shipments. There are six rundown blend events: 70a and 70b, 72a and 72b, and 74a and 74b. 70a and 70b are blended into Tank 1, 72a and 72b are blended into Tank 2, and 74a and 74b are blended into Tank 3. There are five shipments, two in Tank 1 (S1 and S5), one in Tank 2 (S3), and two in Tank 3 (S2 and S4). These shipments are fixed in both time and amount, so the blend events must be scheduled so as to use all of the rundown components and produce the required product in the necessary product tank before their shipments. The dotted lines in the Gantt chart represent the earliest start and latest stop for each blend event, and indicate (or represent) the window of time that each blend event can take place in. The empty boxes drawn just after the blend events show the post-processing time needed for laboratory testing and certification for that blend event.

The data of interest for the rundown components are shown in Table (1). These data points represent the initial values for the rundown components as well as changes in the component rundown volume or property values at discrete times during the time horizon. For instance, the volume of rundown component 1 (Rundown 1) changes from 2.0 KBbl/day to 2.44 KBbl/day on November 6 at 12:00 am. In the addition, the sulfur contribution of component 2 (Rundown 2) changes from 0.050 property units to 0.049 property units on November 4 at 11:59 pm. These data points are used to populate the set of periods for each rundown component, or the set $t \in TC$. The more changes in rundown component data, the more time periods there will be and the larger the resulting mathematical model. For the current example, rundown components 1 and 2 share the same time grid since they are both components in all of the rundown blend events. In the 16-day time horizon, the historical Aspen MBO model has 25 periods and the new formulation (i.e., the present invention improved Aspen MBO technology) for rundown blending uses 20 periods, which are a subset of the historical Aspen MBO periods. The resulting period and formulation information for each rundown blend event is shown in Table (2).

TABLE 1

Volume and Property Data for the Rundown Components.

Rundown Component 1

| Date | VOL | SPG | SUL | CLPT | PRPT | VIS | DIBP | DT70 | DT90 | DFBP |
|---|---|---|---|---|---|---|---|---|---|---|
| 10/27 00:00 | 2.0 | 0.8275 | 0.0510 | 40.30 | 10.00 | 3.40 | 397.0 | 585.0 | 610.0 | 652.0 |
| 10/28 00:00 | 2.0 | 0.8275 | 0.0501 | 47.72 | 45.00 | 3.50 | 403.0 | 598.1 | 633.0 | 683.5 |
| 11/1 00:00 | 2.0 | 0.8275 | 0.0501 | 47.72 | 45.00 | 3.50 | 403.0 | 598.1 | 633.0 | 683.5 |
| 11/6 00:00 | 2.44 | 0.8275 | 0.0501 | 47.72 | 45.00 | 3.50 | 403.0 | 598.1 | 633.0 | 683.5 |

Rundown Component 2

| Date | VOL | SPG | SUL | FLPM | VIS |
|---|---|---|---|---|---|
| 10/27 00:00 | 7.0 | 0.8500 | 0.0500 | 134.00 | 2.90 |
| 10/28 00:00 | 7.0 | 0.8500 | 0.0500 | 150.00 | 2.90 |
| 10/29 00:00 | 7.5 | 0.8500 | 0.0500 | 150.00 | 3.30 |
| 10/31 00:00 | 7.5 | 0.8500 | 0.0500 | 150.00 | 2.30 |
| 11/1 00:00 | 7.0 | 0.8500 | 0.0500 | 150.00 | 2.30 |
| 11/1 01:32 | 7.0 | 0.8500 | 0.0500 | 150.00 | 3.30 |
| 11/2 16:39 | 7.0 | 0.8500 | 0.0500 | 150.00 | 2.90 |
| 11/4 23:59 | 7.0 | 0.8500 | 0.0490 | 150.00 | 2.90 |

TABLE 1-continued

Volume and Property Data for the Rundown Components.

| | | | | | |
|---|---|---|---|---|---|
| 11/6 00:00 | 7.5 | 0.8500 | 0.0510 | 150.00 | 2.90 |
| 11/7 00:00 | 7.5 | 0.8500 | 0.0490 | 150.00 | 3.30 |
| 11/9 00:00 | 7.5 | 0.8500 | 0.0510 | 150.00 | 2.30 |
| 11/10 23:59 | 7.5 | 0.8500 | 0.0490 | 150.00 | 3.30 |
| 11/11 00:00 | 7.5 | 0.8500 | 0.0490 | 150.00 | 2.90 |
| 11/12 00:00 | 7.5 | 0.8500 | 0.0510 | 150.00 | 2.90 |

Acronyms:
VOL = volume, Bbls;
WGT = weight, MLbs;
SPG = specific gravity;
SUL = sulfur, wt %;
API = API gravity;
FLPM = Pensky-Martens flash point;
CLPT = cloud point diesel;
PRPT = pour point diesel;
CI = cetane index;
VIS = viscosity at 40° C. diesel;
DIBP = distillate IBP;
DT10 = distillate T10;
DT30 = distillate T30;
DT50 = distillate T50;
DT70 = distillate T70;
DT90 = distillate T90;
DFBP = distillate FBP;
DENS = density gm/cm at 15° C.

TABLE 2

Period and Formulation Information for each Rundown Blend Event.

| | Set of Periods TBC | Number of Binary Vars | Number of Cont. Vars. | Number of Equations |
|---|---|---|---|---|
| Blend 70a | 1-4 | 16 | 372 | 120 |
| Blend 74a | 2-8 | 28 | 486 | 159 |
| Blend 72a | 4-10 | 28 | 486 | 159 |
| Blend 74b | 10-15 | 24 | 448 | 146 |
| Blend 70b | 8-17 | 40 | 600 | 198 |
| Blend 72b | 14-20 | 28 | 486 | 159 |
| Total | | 164 | 2878 | 971 |

The manually-created schedule in FIG. 5 is not optimal for this rundown blending example because it does not use the rundown components on a continuous basis. In order to implement this schedule, intermediate tanks would be needed to make sure the rundown components were not dumped onto the ground. Gaps in the Gantt chart for the rundown components indicate locations where intermediate storage would be needed. Furthermore, trying to manually move the rundown blend events in this schedule in order to find a solution where the rundown components are used continuously and all of the products meet their specification would be extremely difficult if not impossible. Optimizing the contribution of the static components, or additives, in order to minimize their cost and minimize the giveaway would also be extremely difficult if not impossible. Instead, embodiments of the present invention with rundown blending solve this problem and at the same time maximize the economic objectives.

Figure 6:
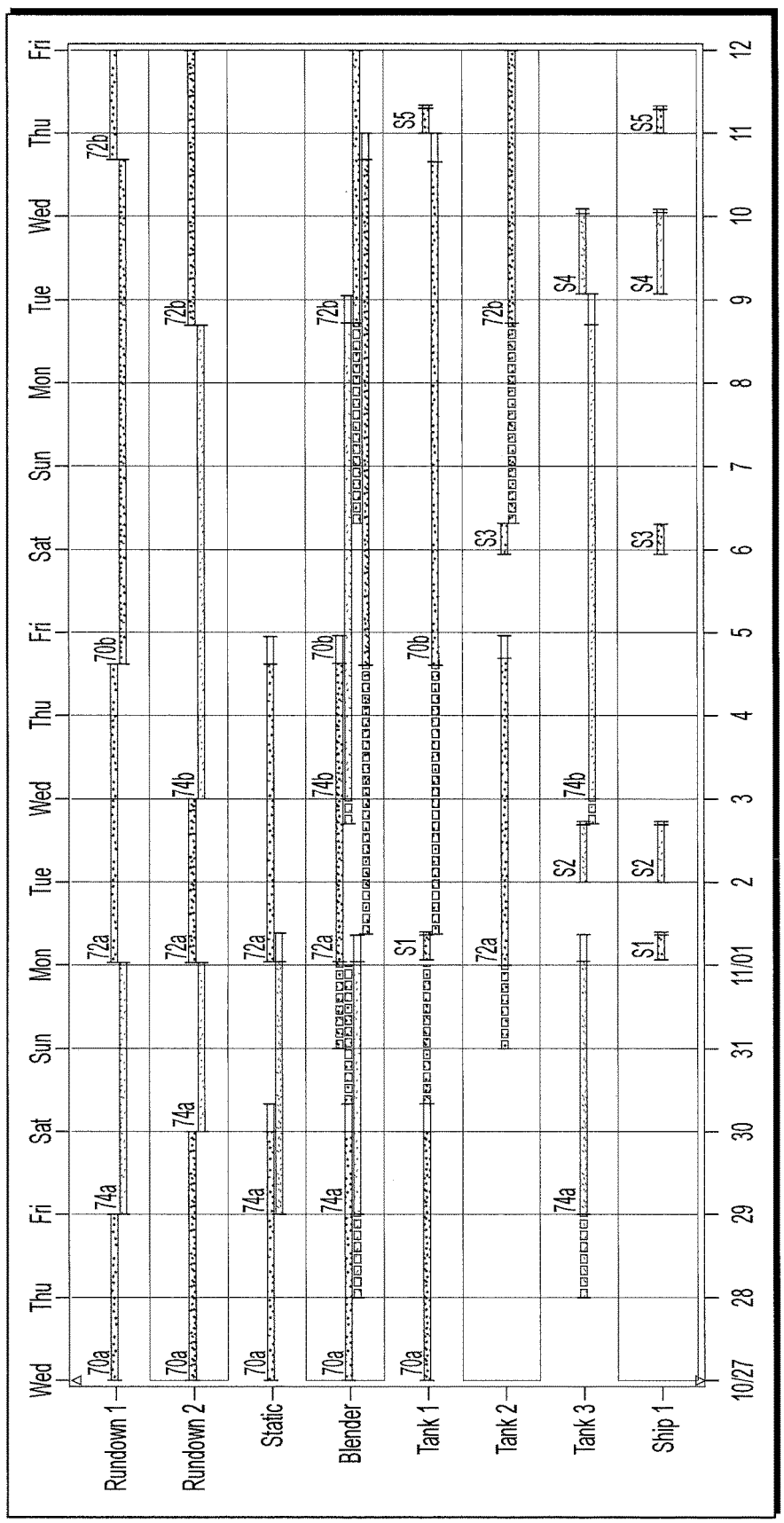
FIG. 6 is a schematic illustration of a Gantt chart optimized according to this invention.

The optimal blend schedule determined by the improved Aspen MBO technology with rundown blending is shown in FIG. 6. The model has 4178 variables, 2299 equations, and 12431 non-zeros. The solution is achieved in 4 iterations with a campaign gross margin of $1240, taking 5.9 seconds. The period utilization and component volumes for each blend are shown in Table (3).

TABLE 3

Period Information for each Rundown Blend Event.

| | Start-Stop RD Comp 1 | Start-Stop RD Comp 2 | Volume RD Comp 1 | Volume RD Comp 2 | Volume Static Comp |
|---|---|---|---|---|---|
| Blend 70a | 1-3 | 1-3 | 4.00 | 21.45 | 3.26 |
| Blend 74a | 3-6 | 3-6 | 6.06 | 15.25 | 0.87 |
| Blend 72a | 6-10 | 6-10 | 7.16 | 13.89 | 4.97 |
| Blend 74b | 10-10 | 10-15 | 0.00 | 41.19 | 0.00 |
| Blend 70b | 11-17 | 11-11 | 14.17 | 0.00 | 0.00 |
| Blend 72b | 18-20 | 16-20 | 3.26 | 24.71 | 0.00 |

The timing for the rundown blend events on the Gantt chart in FIG. 6 is based on the total volumes of the rundown components used. The usage of rundown component 1 in blend event 70a starts on October 27 at 12:00 am and ends on October 29 at 12:00 am. It takes two days because blend event 70a uses 4.0 KBbl of rundown component 1, at a rate of 2.0 KBbl/day. Blend event 70a also uses 21.45 KBbl of rundown component 2. The usage of this component in blend event 70a starts on October 27 at 12:00 am and ends on October 29 at 11:50 pm. The rate for the first two days is 7.0 KBbl/day and for October 29 the rate is 7.5 KBbl/day, so blend event 70a takes just under three days to consume 21.45 KBblof rundown component 2. Thus, the consolidated time for blend event 70a for both rundown components is from October 27 at 12:00 am to October 29 at 11:50 pm, which is shown in the blender in the Gantt chart, where the post-processing time for blend event 70a of 8 hours is also shown by the empty box following the blend event. The dotted bar after the post-processing time indicates the blend window that this blend event could occur in. Therefore, blend event 70a could have floated (i.e., could be moved) anywhere between October 27 at 12:00 am and the beginning of the shipment S1 in the same product tank, Tank 1, on November 1 at 1:32 am. The improved Aspen MBO technology with rundown blending was able to determine the optimal timing and recipe of this blend event so as to remain feasible and optimize the economics.

At solution, for blend event 70a, binary variables yB(70a, RD1, t1) and yE(70a, RD1, t3) are active, where RD1 indicates rundown component 1 and the two variables determine that this event starts at time point 1 (t1) and stops at time point 3 (t3). The XRD(70a, RD1, t) variables are used to determine the volume of rundown component RD1 used at each time point in the set of possible time points for RD1 in blend event 70a. For time point 1, XRD(70a, RD1, t1)=2.0, for time point 2, XRD(70a, RD1, t2)=2.0, for time point 3, XRD(70a, RD1, t3)=0.0, and for time point 4, XRD(70a, RD1, t4)=0.0. The total for RD1 in blend event 70a is then the sum of these variables, plus any extra contributions at the start and end periods, represented by XRDS(70a, RD1) and XRDE(70a, RD1), respectively, which are both 0.0. Thus the total volume for RD1 in blend event 70a, represented by variable X(70a, RD1), is 4.0, and is calculated through equation (25), which is a specific instance of equation (12).

$$XRD(70a, RD1, p1) + XRD(70a, RD1, p2) + \\ XRD(70a, RD1, p3) + XRD(70a, RD1, p4) + \\ XRDE(70a, RD1) - XRDS(70a, RD1) = X(70a, RD1) \quad (25)$$

The optimal solution of this example problem maximizes the profit while taking into account all of the economic factors including additives, rundown components, storage costs, and the robustness of the schedule. The improved Aspen MBO with rundown blending is much easier to use than manual trial-and-error methods in Excel, or other tools which were previously needed to find feasible blend schedules. The blend schedule determined by the optimization provides for stream containment and ensures that all products meet their specifications. However, it also minimizes the use of slop tanks and the incidence of product giveaway. Slop tanks are used to remain feasible when storage tanks become full, but contents of slop tanks must be downgraded for sale, making them undesirable. Giveaway occurs when premium quality product must be given away for the regular product price. The improved Aspen MBO technology with rundown blending is able to avoid both of these costly practices while still finding a feasible and economically optimal blend schedule.

The second example problem used to demonstrate rundown blending includes the modeling of splitters. This example is directed to distillate and fuel oil blending and the time horizon of interest is 14 days. During the time horizon, there are 15 rundown blend events for three different products. There are two splitters that separate the two rundown streams into three streams each. For each splitter, two output streams are rundown and the third is sent to a static tank, resulting in four total rundown streams used as components in the rundown blend events. In addition, there are five product tanks used by the rundown blend events and 16 fixed shipments spread out over the horizon. The challenge of rundown blending is to determine the sequence and timing of the blend events as well as their optimal recipes while ensuring that the entire volume of both rundowns is used as it becomes available.

Figure 7:
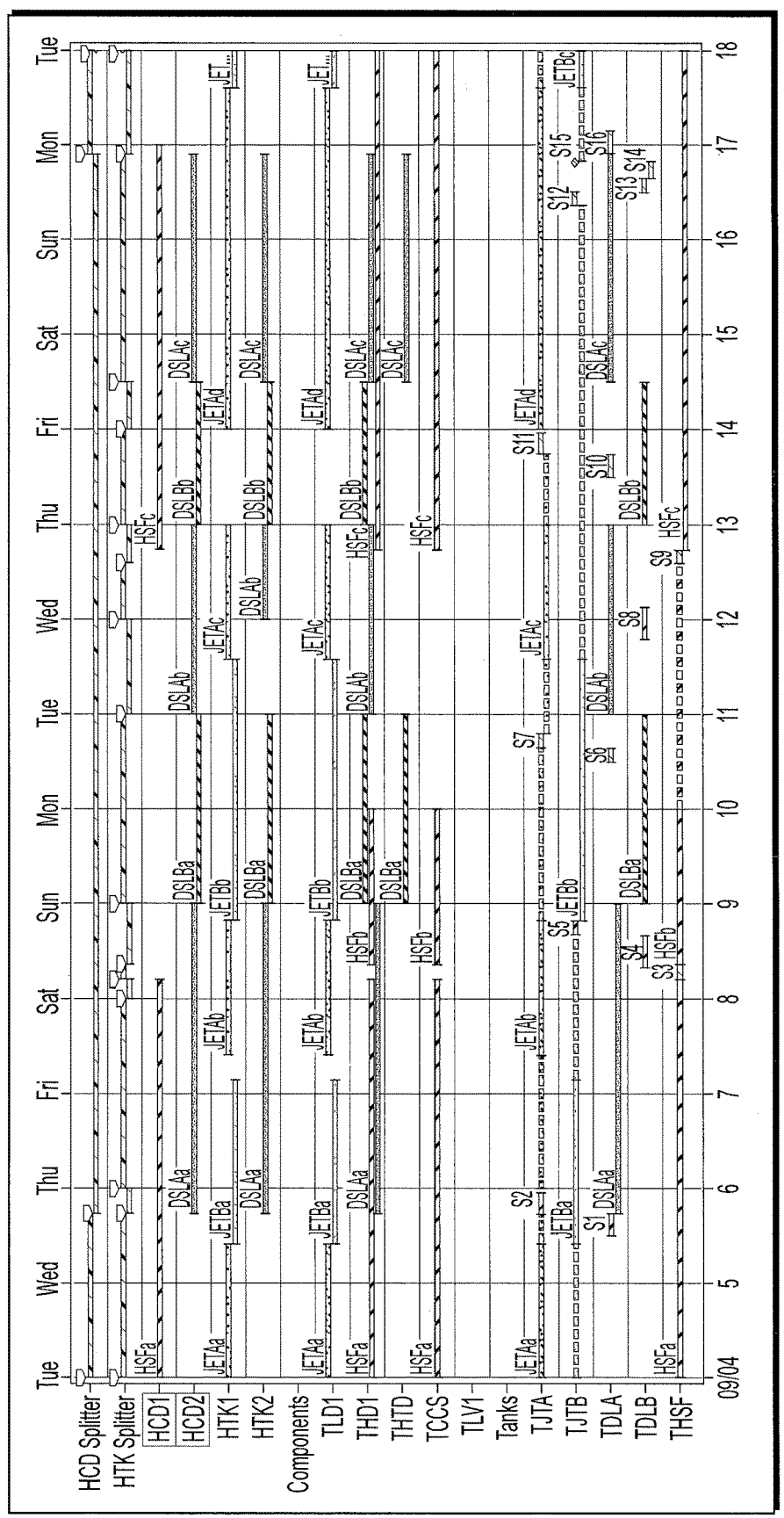
FIG. 7 is a schematic illustration of a manually created Gantt chart including component splitters.

The Gantt chart for a manually created blend schedule is shown in FIG. 7. The bottom of the chart shows the time horizon, from September 4 to September 18, or 14 days. The labels on the left side are the individual resources in the process. The two rows at the top, HCD Splitter and HTK Splitter, show the splitter operations and the next four rows, HCD1, HCD2, HTK1, and HTK2, are the rundown streams coming out of the two splitters. The next five rows, TLD1, THD1, THTD, TCCS, and TLV1, are the static components and the bottom five rows, TJTA, TJTB, TDLA, TDLB, and THSF, are for the product tanks and these show the blend events and product shipments. There are 15 rundown blend events for three products and there are a total of 16 shipments across the five product tanks These shipments are fixed in both time and amount, so the blend events must be scheduled so as to use all of the rundown components and produce the required product in the necessary product tank before their shipments. The first product is JET and has seven rundown blend events using the HTK1 rundown component. JET is blended into the first two product tanks, TJTA and TJTB, with six shipments, S2, S5, S7, S11, S12, and S15. The second product is DSL and has five rundown blend events using rundown components HCD2 and HTK2. DSL is blended into the next two product tanks, TDLA and TDLB, with eight shipments, S1, S4, S6, S8, S10, D13, S14, and S16. The third product is HSF and has three rundown blend events using rundown component HCD1. HSF is blended into the fifth product tank, THSF, with two shipments, S3 and S9. The dotted lines in the Gantt chart represent the earliest start and latest stop for each blend event, and indicate the window of time that each blend event can take place in.

The data of interest for the rundown components are shown in Table (4). These data points represent the initial values for the rundown components as well as changes in the component rundown volume or property values at discrete times during the time horizon. For the splitter example, the four rundown components do share the same time grid since one of the products, DSL, uses rundowns from both of the splitter product streams. In the 14-day time horizon, the original MBO model has 44 periods and the new formulation for rundown blending uses 28 periods, which are a subset of the original MBO periods.

TABLE 4

Volume and Property Data for the Rundown Components.

| Rundown Component HCD | | Rundown Component HTK | | | | | | |
|---|---|---|---|---|---|---|---|---|
| Date | VOL | Date | VOL | SPG | ARO | CBI | POUR | VISC |
| 9/4 00:00 | 30.2 | 9/4 00:00 | 9.6 | 0.831 | 20.3 | 18.2402 | −21.29 | 3.16 |
| 9/5 00:00 | 30.4 | 9/5 00:00 | 9.6 | 0.83 | 20.2 | 48.3374 | −21.69 | 3.16 |
| 9/6 00:00 | 30.6 | 9/6 00:00 | 9.6 | 0.828 | 20.2 | 48.7469 | −22.16 | 3.16 |
| 9/7 00:00 | 30.7 | 9/7 00:00 | 9.6 | 0.827 | 20.1 | 48.6034 | −22.13 | 3.15 |
| 9/8 00:00 | 30.9 | 9/8 00:00 | 9.6 | 0.825 | 20.1 | 48.697 | −21.55 | 3.14 |
| 9/9 00:00 | 31 | 9/9 00:00 | 9.6 | 0.825 | 20.1 | 48.6309 | −21.1 | 3.14 |
| 9/10 00:00 | 31.1 | 9/10 00:00 | 9.6 | 0.824 | 20.1 | 48.5654 | −20.83 | 3.15 |
| 9/11 00:00 | 31.2 | 9/11 00:00 | 9.6 | 0.824 | 20.2 | 48.5176 | −20.7 | 3.15 |
| 9/12 00:00 | 31.3 | 9/12 00:00 | 9.6 | 0.824 | 20.2 | 48.4214 | −20.48 | 3.16 |
| 9/13 00:00 | 31.3 | 9/13 00:00 | 9.6 | 0.824 | 20.2 | 48.3339 | −20.29 | 3.17 |
| 9/14 00:00 | 31.4 | 9/14 00:00 | 9.6 | 0.824 | 20.3 | 48.2864 | −20.16 | 3.17 |

TABLE 4-continued

Volume and Property Data for the Rundown Components.

| Rundown Component HCD | | Rundown Component HTK | | | | | | |
|---|---|---|---|---|---|---|---|---|
| Date | VOL | Date | VOL | SPG | ARO | CBI | POUR | VISC |
| 9/15 00:00 | 31.4 | 9/15 00:00 | 9.6 | 0.824 | 20.3 | 48.2799 | −20.3 | 3.17 |
| 9/16 00:00 | 31.4 | 9/16 00:00 | 9.6 | 0.824 | 20.3 | 48.3107 | −20.74 | 3.17 |
| 9/17 00:00 | 30.8 | 9/17 00:00 | 9.6 | 0.824 | 20.3 | 48.3364 | −21.13 | 3.17 |

The manually-created schedule in FIG. 7 is not optimal for the rundown blending example because it does not reliably use the rundown components on a continuous basis and there are frequent split ratio changes in splitter HTK. In order to implement this schedule, intermediate tanks would be needed to make sure the rundown components were not dumped onto the ground and refinery personnel would have to change the operation of the splitter on a regular basis. Again, trying to manually modify the schedule in order to find an optimal solution would be extremely difficult if not impossible. Instead, the improved Aspen MBO technology with rundown blending can solve this problem and at the same time maximize the economic objectives.

Figure 8:
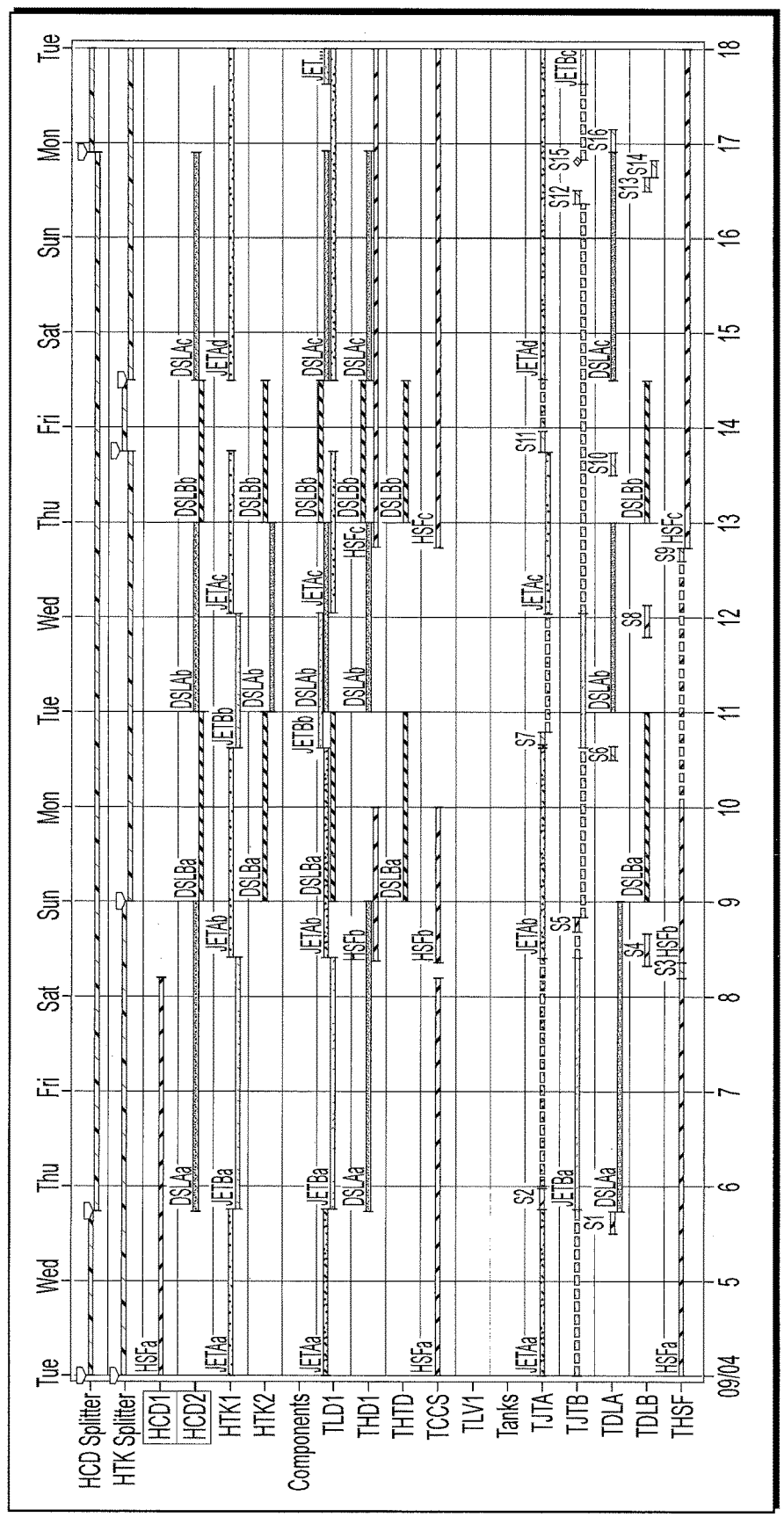
FIG. 8 is a schematic illustration of a Gantt chart including component splitters, optimized according to this invention.

The optimal blend schedule determined by the improved Aspen MBO technology with rundown blending is shown in FIG. 8. The model including the original MBO model has 12120 variables, 5891 equations, and 24880 non-zeros. This solution minimizes the change in split ratio for both of the splitters and ensures that all four rundown streams are used continuously, if needed. In addition, all shipments are met on-time and on-spec and the incidence of product giveaway is minimized.

The improved Aspen MBO technology with rundown blending is much easier to use than manual trial-and-error methods in Excel, or other tools which were previously needed to find feasible blend schedules. The blend schedule determined by the optimization provides for stream containment and ensures that all products meet their specifications. This invention also enables the simultaneous optimization of blending and upstream unit operations that are producing components used in blending operations. However, it also minimizes the use of slop tanks and the incidence of product giveaway.

Computer Implementation

Figure 9:
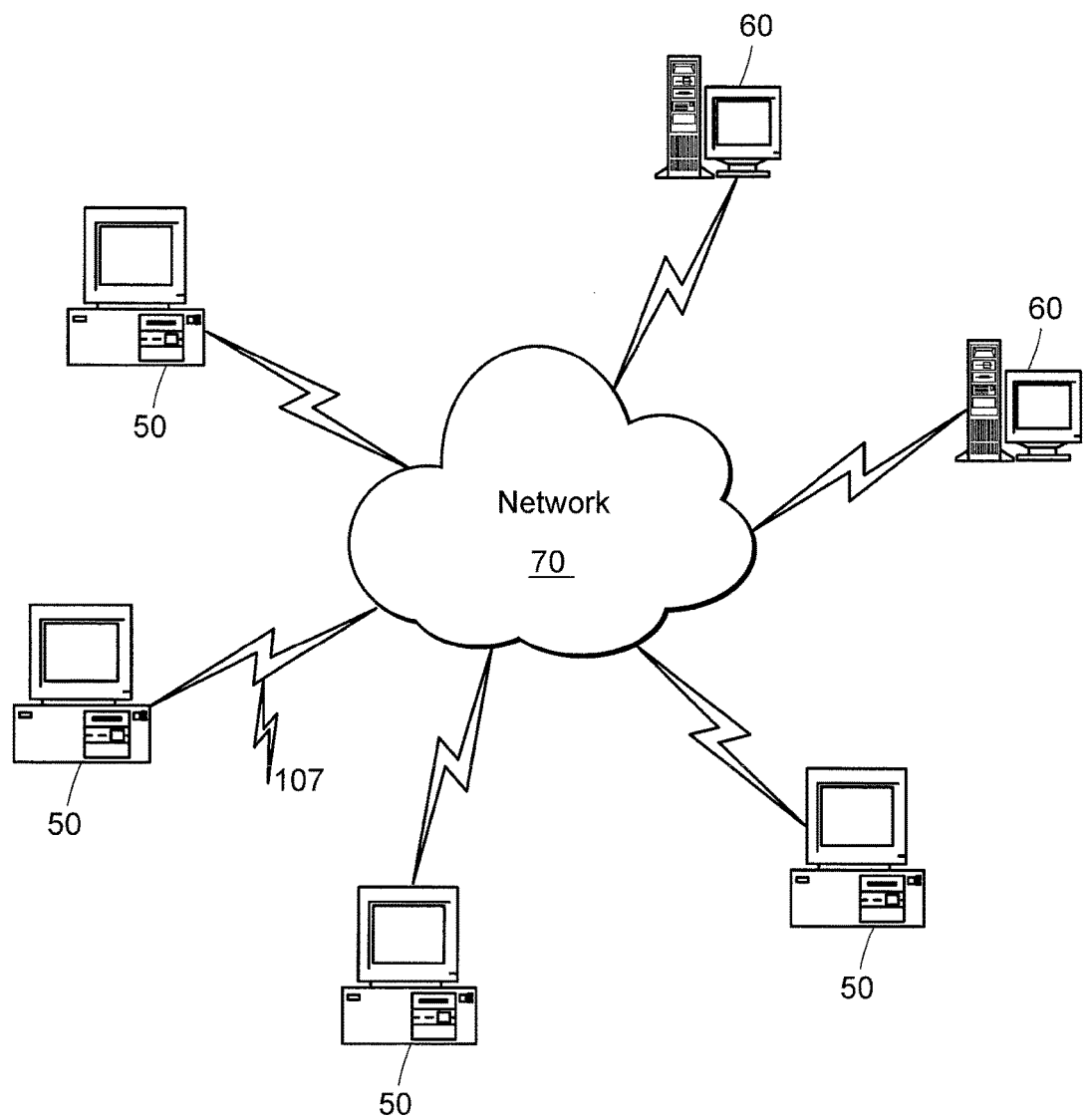
FIGS. 9 and 10 are schematic views of a computer system and network implementation of the present invention.
Figure 10:
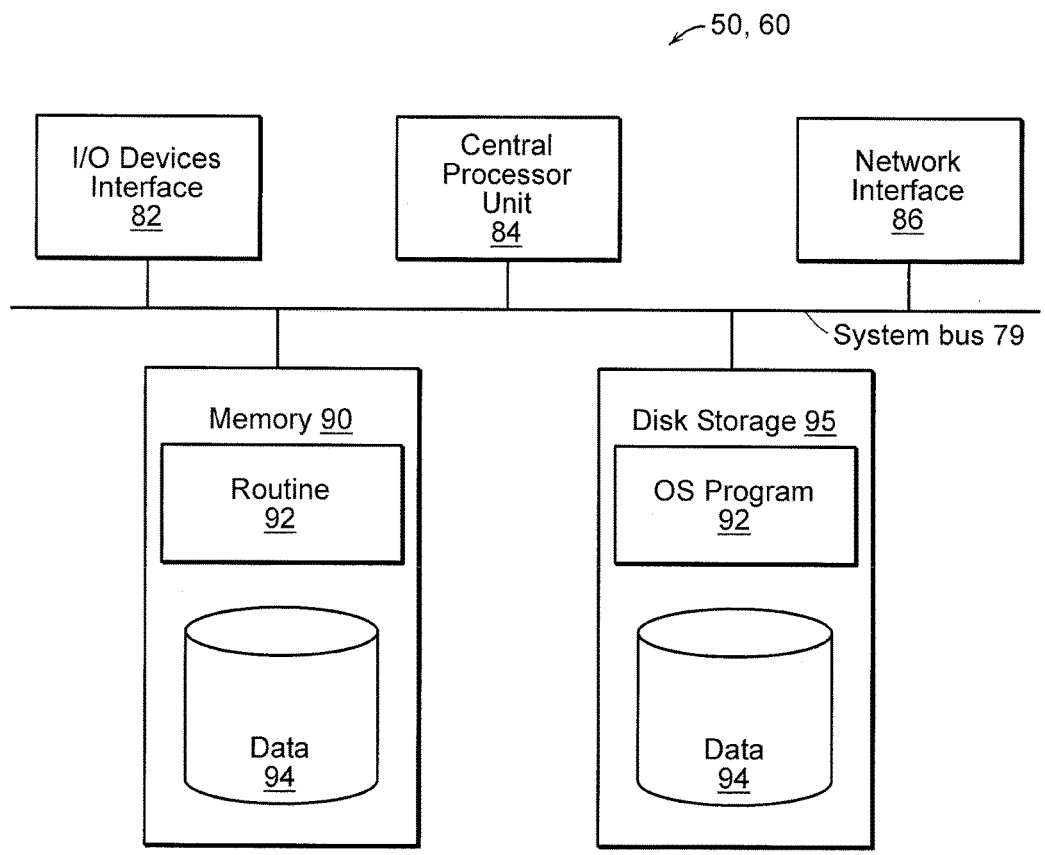

Turning now to FIGS. 9, 10 and 4, a computer system embodying the present invention is shown and described. It is understood that other computer architectures and configurations are suitable and in the purview of one skilled in the art given this description.

FIG. 9 illustrates a computer network or similar digital processing environment in which the present invention may be implemented.

Client computer(s)/devices 50 and server computer(s) 60 provide processing, storage, and input/output devices executing application programs and the like. Client computer(s)/devices 50 can also be linked through communications network 70 to other computing devices, including other client devices/processes 50 and server computer(s) 60. Communications network 70 can be part of a remote access network, a global network (e.g., the Internet), a worldwide collection of computers, Local area or Wide area networks, and gateways that currently use respective protocols (TCP/IP, Bluetooth, etc.) to communicate with one another. Other electronic device/computer network architectures are suitable.

FIG. 10 is a diagram of the internal structure of a computer (e.g., client processor/device 50 or server computers 60) in the computer system of FIG. 9. Each computer 50, 60 contains system bus 79, where a bus is a set of hardware lines used for data transfer among the components of a computer or processing system. Bus 79 is essentially a shared conduit that connects different elements of a computer system (e.g., processor, disk storage, memory, input/output ports, network ports, etc.) that enables the transfer of information between the elements. Attached to system bus 79 is I/O device interface 82 for connecting various input and output devices (e.g., keyboard, mouse, displays, printers, speakers, etc.) to the computer 50, 60. Network interface 86 allows the computer to connect to various other devices attached to a network (e.g., network 70 of FIG. 9). Memory 90 provides volatile storage for computer software instructions 92 and data 94 used to implement an embodiment of the present invention (e.g., rundown blending modeler 400, and supporting code detailed above). Disk storage 95 provides non-volatile storage for computer software instructions 92 and data 94 used to implement an embodiment of the present invention. Central processor unit 84 is also attached to system bus 79 and provides for the execution of computer instructions.

In one embodiment, the processor routines 92 and data 94 are a computer program product (generally referenced 92), including a computer readable medium (e.g., a removable storage medium such as one or more DVD-ROM's, CD-ROM's, diskettes, tapes, etc.) that provides at least a portion of the software instructions for the invention system. Computer program product 92 can be installed by any suitable software installation procedure, as is well known in the art. In another embodiment, at least a portion of the software instructions may also be downloaded over a cable, communication and/or wireless connection. In other embodiments, the invention programs are a computer program propagated signal product 107 embodied on a propagated signal on a propagation medium (e.g., a radio wave, an infrared wave, a laser wave, a sound wave, or an electrical wave propagated over a global network such as the Internet, or other network(s)). Such carrier medium or signals provide at least a portion of the software instructions for the present invention routines/program 92.

In alternate embodiments, the propagated signal is an analog carrier wave or digital signal carried on the propagated medium. For example, the propagated signal may be a digitized signal propagated over a global network (e.g., the Internet), a telecommunications network, or other network. In one embodiment, the propagated signal is a signal that is transmitted over the propagation medium over a period of time, such as the instructions for a software application sent in packets over a network over a period of milliseconds, seconds, minutes, or longer. In another embodiment, the computer readable medium of computer program product 92 is a propagation medium that the computer system 50 may receive and read, such as by receiving the propagation medium and identifying a propagated signal embodied in the propagation medium, as described above for computer program propagated signal product.

Generally speaking, the term "carrier medium" or transient carrier encompasses the foregoing transient signals, propagated signals, propagated medium, storage medium and the like.

FIG. 4 illustrates the workflows 400 supported by the improved and optimized Aspen MBO system according to principles of the present invention. In particular, illustrated in FIG. 4 is an exemplary workflow diagram of a rundown blending modeler of the present invention (generally indicated as engine or modeler 400). The flow of data and processor 84 control is provided for purposes of illustration and not limitation. It is understood that processing may be in parallel, distributed across multiple processors, in different order than that shown or otherwise programmed to operate in accordance with the principles of the present invention.

Output of the modeler 400 is an optimized schedule which can be presented in various forms. In one form, modeler 400 presents the optimized schedule for screen display (for example in a user interface or report generation). In another form, modeler 400 transmits the optimized schedule to other plant applications, such as blending control or plant process control systems. There, the optimized schedule (its output values) provide new value range (input value) to parameters and variables of the control system. This updates or reinitializes the control system's operations.

The relevant teachings of all patents, published applications and references cited herein are incorporated by reference in their entirety.

While this invention has been particularly shown and described with references to example embodiments thereof, it will be understood by those skilled in the art that various changes in form and details may be made therein without departing from the scope of the invention encompassed by the appended claims.

What is claimed is:

1. A computer modeling apparatus, comprising:
   an input module enabling: (i) user specification of inventory information including one or more rundown blending components without an intermediate storage tank but with splitters that separate the one or more rundown blending components, and (ii) user specification of refinery product commitments;
   a processor routine executable by a computer and coupled to the input module, the processor routine responding to the user specification by sequencing refinery operations into an optimized multi-period, multi-event schedule that matches the refinery product commitments with (a) the inventory information and (b) rundown blending component operations without intermediate storage tanks, wherein the processor routine optimizes scheduling of the rundown blending component operations directly off a process unit to a finished product tank without having intermediate storage tanks;
   the processor routine sequencing the refinery operations into the optimized refinery operations schedule by comprehensively modeling nonlinear properties, linear properties, nonlinear constraints, and discrete constraints of the rundown blending component operations as an optimization problem, the modeling formulating the optimized refinery operations schedule to simultaneously optimize each of:
   (i) sequence and timing of refinery operations events, including determining optimal number and duration of event periods for the sequencing of the refinery operations events,
   (ii) split ratio of splitters, and according to the optimum split ratio, scheduling the splitters to separate the rundown blending component operations into multiple component streams of different flow and quality, the splitters changing properties of at least one of the multiple component streams, and
   (iii) recipes for product blends in the refinery product commitments, the optimal recipes including optimal components and optimal amounts; and
   an output module including:
   a display member receiving the optimized refinery operations schedule from the processor routine and providing a display of the optimized refinery operations schedule; and
   a blending control system receiving the optimized refinery operations schedule from the processor routine, wherein the blending control system adjusts parameters of the rundown blending component operations based on the received optimized refinery operations schedule, such that the blending control system controls the rundown blending components in a manner that simultaneously optimizes the sequence and timing of the refinery operations events, the split ratio of the splitters, and the recipes for the product blends.

2. The computer modeling apparatus of claim 1, wherein refinery operations events include blending, transferring, receiving, or shipping components and/or refinery products, or any combination thereof.

3. The computer modeling apparatus of claim 1, wherein inventory information includes tank levels and properties for at least one stored component.

4. The computer modeling apparatus of claim 1, wherein sequencing refinery operations events includes moving refinery operations events.

5. The computer modeling apparatus of claim 1, wherein sequencing refinery operations events includes switching rundown component operations between refinery products and/or associated tanks.

6. The computer modeling apparatus of claim 1, wherein the splitters separate the rundown blending component operations between refinery products and/or associated tanks.

7. The computer modeling apparatus of claim 6, wherein separating the rundown blending component operations includes changing qualities of at least one of the multiple component streams.

8. A computer-implemented method of scheduling refinery operations, comprising:
   in a digital processor:
   collecting inventory information including one or more rundown blending components without an intermediate storage tank but with splitters that separate the one or more rundown blending components;
   collecting refinery product commitments of a refinery;
   optimizing a schedule of refinery operations by sequencing refinery operations events into a multi-period, multi-event schedule that matches the refinery product commitments with (a) the inventory information and (b) rundown blending component operations without intermediate storage tanks, wherein optimizing scheduling of the rundown blending component operations directly off a process unit to a finished product tank without having intermediate storage tanks, sequencing the refinery operations into the optimized refinery operations schedule being by comprehensively modeling nonlinear properties, linear properties, nonlinear constraints, and discrete constraints of the rundown blending component operations as an optimization problem, the modeling formulating the optimized refinery operations schedule to simultaneously optimize each of:
(i) sequence and timing of the refinery operations events, including determining optimal number and duration of event periods for the sequencing of the refinery operations events,
(ii) split ratio of splitters, and according to the optimum split ratio, scheduling the splitters to separate the rundown blending component operations into multiple component streams of different flow and quality, the splitters changing properties of at least one of the multiple component streams, and
(iii) recipes for product blends in the refinery product commitments, the optimal recipes including optimal components and optimal amounts; and
outputting the optimized schedule including:
displaying on a computer monitor the optimized schedule of the refinery operations; and
transmitting the optimized schedule to a blending control system, wherein the blending control system adjusts parameters of the rundown blending component operations based on the optimized refinery operations schedule, such that the blending control system controls the rundown blending components in a manner that simultaneously optimizes the sequence and timing of the refinery operations events, the split ratio of the splitters, and the recipes for the product blends.

9. The method of scheduling refinery operations of claim 8, wherein refinery operations events include blending, transferring, receiving, or shipping components and/or refinery products, or any combination thereof.

10. The method of scheduling refinery operations of claim 8, wherein inventory information includes tank levels and properties for at least one stored component.

11. The method of scheduling refinery operations of claim 8, wherein sequencing refinery operations events includes moving events.

12. The method of scheduling refinery operations of claim 8, wherein sequencing refinery operations events includes switching rundown component operations between refinery products and/or associated tanks.

13. The method of scheduling refinery operations of claim 8, wherein the splitters separate the rundown blending component operations between refinery products and/or associated tanks.

14. The method of scheduling refinery operations of claim 13, wherein separating the rundown blending component operations includes changing qualities of at least one of the multiple component streams.

15. The computer modeling apparatus of claim 1, wherein the optimization problem is a mixed-integer nonlinear optimization problem (MINLP).

16. The method of scheduling refinery operations of claim 8, wherein the optimization problem is a mixed-integer nonlinear optimization problem (MINLP).

* * * * *